United States Patent
Li et al.

(10) Patent No.: US 9,560,552 B2
(45) Date of Patent: Jan. 31, 2017

(54) ENHANCEMENT TO MULTIPLE HANDOVER PREPARATION

(71) Applicant: FUJITSU LIMITED, Kawasaki-shi, Kanagawa (JP)

(72) Inventors: Zhaojun Li, Guildford Surrey (GB); Paul Bucknell, Brighton (GB)

(73) Assignee: FUJITSU LIMITED, Kawasaki (JP)

(*) Notice: Subject to any disclaimer, the term of this patent is extended or adjusted under 35 U.S.C. 154(b) by 78 days.

(21) Appl. No.: 14/032,947

(22) Filed: Sep. 20, 2013

(65) Prior Publication Data

US 2014/0023045 A1    Jan. 23, 2014

Related U.S. Application Data

(63) Continuation of application No. PCT/EP2011/056634, filed on Apr. 27, 2011.

(51) Int. Cl.
*H04W 4/00* (2009.01)
*H04W 36/00* (2009.01)
(Continued)

(52) U.S. Cl.
CPC ..... *H04W 36/0016* (2013.01); *H04W 36/0055* (2013.01); *H04W 24/10* (2013.01);
(Continued)

(58) Field of Classification Search
CPC .. H04W 36/0083; H04W 36/30; H04W 76/02; H04W 92/20; H04L 5/001
(Continued)

(56) References Cited

U.S. PATENT DOCUMENTS 8,571,555 B2 * 10/2013 Godin ............... H04W 36/02
370/328
8,909,227 B2   12/2014 Kitazoe et al.
(Continued)

FOREIGN PATENT DOCUMENTS

CN   101374350 A   2/2009
CN   101534533 A   9/2009
(Continued)

OTHER PUBLICATIONS

3GPP TSG RAN WG3 # 70bis meeting; Further consideration on multiple handover preparation in relay network R3-110090; Huawei; Dublin, Ireland. Jan. 17-21, 2011.*
(Continued)

*Primary Examiner* — Faisal Choudhury
(74) *Attorney, Agent, or Firm* — Myers Wolin, LLC

(57) ABSTRACT

A communication system includes a plurality of base stations and a user equipment, wherein the communication link is established between the user equipment and a source base station of the plurality of base stations. A method includes: selecting a target cell and a re-establishment cell of at least one candidate handover base station of the plurality on the basis of a measurement report, the measurement report comprising measurements of attributes of cells of the plurality of base stations for a handover; initiating a handover preparation by transmitting a request from the source base station to the at least one candidate handover base station, wherein the request indicates the target cell and the re-establishment cell; carrying out admission control on the target cell and on the re-establishment cell; initiating the handover by transmitting a handover request acknowledgement from the at least one candidate handover base station to the source base station.

12 Claims, 9 Drawing Sheets

(51) Int. Cl.
  *H04W 24/10* (2009.01)
  *H04W 36/08* (2009.01)
  *H04W 36/30* (2009.01)
  *H04W 76/02* (2009.01)
  *H04W 92/20* (2009.01)

(52) U.S. Cl.
  CPC ............ *H04W 36/08* (2013.01); *H04W 36/30* (2013.01); *H04W 76/02* (2013.01); *H04W 92/20* (2013.01)

(58) Field of Classification Search
  USPC .......................................................... 370/331
  See application file for complete search history.

(56) References Cited

U.S. PATENT DOCUMENTS

| | | | |
|---|---|---|---|
| 2006/0172738 | A1 | 8/2006 | Kwon et al. |
| 2009/0047965 | A1* | 2/2009 | Godin .................. H04W 36/02 455/438 |
| 2009/0061878 | A1* | 3/2009 | Fischer .................. G08C 17/02 455/436 |
| 2010/0075675 | A1* | 3/2010 | Yang ................. H04W 36/0094 455/436 |
| 2010/0142485 | A1* | 6/2010 | Lee ....................... H04W 36/02 370/331 |
| 2010/0178920 | A1 | 7/2010 | Kitazoe et al. |
| 2011/0039552 | A1* | 2/2011 | Narasimha .......... H04W 76/028 455/425 |
| 2011/0122843 | A1* | 5/2011 | Iwamura ............... H04W 12/04 370/331 |
| 2013/0059587 | A1* | 3/2013 | Lindoff ............. H04W 36/0083 455/436 |
| 2013/0079018 | A1* | 3/2013 | Teyeb .................... H04W 36/32 455/441 |
| 2013/0178214 | A1* | 7/2013 | Zhang ............... H04W 36/0055 455/436 |

FOREIGN PATENT DOCUMENTS

| | | |
|---|---|---|
| EP | 2028890 | 2/2009 |
| JP | 2010-506506 A | 2/2010 |
| WO | 2008/042906 A2 | 4/2008 |
| WO | 2010/017961 | 2/2010 |

OTHER PUBLICATIONS

Notice of Preliminary Rejection issued for corresponding Korean Patent Application No. 10-2013-7028204, mailed on Feb. 23, 2015, with English translation.
Alcatel-Lucent, "Impact of Multiple handover preparations on RAN3 specifications", Agenda Item: 7.3.1, 3GPP TSG RAN3 Meeting #57 bis, R3-071876, Sophia Antipolis, France, Oct. 8-11, 2007.
Fujitsu et al., "Outbound Multiple Handover Preparation in Relaying Networks", Agenda Item: 14, 3GPP TSG-RAN WG3 Meeting #71, R3-110668, Taipei, Taiwan, Feb. 21-25, 2011.
3GPP TS 36.300 V10.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); "Overall description; Stage 2 (Release 10)"; Mar. 2011.
3GPP TS 36.331 V10.1.0; 3rd Generation Partnership Project; Technical Specification Group Radio Access Network; Evolved Universal Terrestrial Radio Access (E-UTRA); Radio Resource Control (RRC); "Protocol specification (Release 10)"; Mar. 2011.
3GPP TS 36.423 V10.1.0; 3rd Generation Partnership Project; Technical Specification Group Radio Access Network; Evolved Universal Terrestrial Radio Access Network (E-UTRAN); "X2 application protocol (X2AP) (Release 10)"; Mar. 2011.
Nortel; "Multi-eNB Handover preparation for Radio Link Failure Recovery"; Agenda Item: 13.2.7; 3GPP TSG-RAN WG3 Meeting #57; R3-071595; Athens, Greece; Aug. 20-24, 2007.
International Search Report issued for corresponding International Patent Application No. PCT/EP2011/056634.
English Translation of Non-final Notice of Reason(s) for Rejection issued for corresponding Japanese Patent Application No. 2014-506766, mailed on Feb. 3, 2015.
Fujitsu et al., "Multiple handover preparations in inbound handover scenario in relaying networks", Agenda Item: 14, 3GPP TSG-RAN WG3 Meeting #71, R3-110667, Taipei, Taiwan, Feb. 21-25, 2011.
Huawei, "Further considerations on multiple handover preparations in relaying network", Agenda Item: 14.2, 3GPP TSG RAN WG3 #70bis meeting, R3-110090, Dublin, Ireland, Jan. 17-21, 2011.
First Notification of Office Action issued for corresponding Chinese Patent Application No. 201180070438.1 issued on Feb. 1, 2016 with an English translation.

* cited by examiner

ENHANCEMENT TO MULTIPLE HANDOVER PREPARATION

This is a continuation of Application PCT/EP2011/056634, filed Apr. 27, 2011, the contents of which are herein wholly incorporated by reference.

Certain embodiments of the present invention relate to a method for preparing a handover of a communications link in a mobile communication system, the mobile communication system comprising a plurality of base stations and a user equipment, wherein the communication link is established between the user equipment and a source base station of the plurality of base stations. The certain embodiments of the present invention further relate to a mobile communication system, a base station for use as a source base station and/or target base station and a user equipment adapted to carry out the handover method. Particularly, but not exclusively, certain embodiments of the present invention relates to a handover method compliant with the LTE (Long Term Evolution) and LTE-Advanced radio technology groups of standards as, for example, described in the 36-series (in particular, specification documents 36.xxx and documents related thereto), releases 9, 10 and subsequent of the 3GPP specification series. However, the present invention is also applicable to UMTS, WiMAX and other communication systems in which a communication link between a mobile communication device and a serving communication device is prepared to be handed over to a target communication device.

Universal Mobile Telecommunications System (UMTS) or 3G wireless communication systems are deployed worldwide. Future development of UMTS systems is centred on the LTE and LTE-Advanced radio technology. 3GPP is defining specifications for advanced functions and features for LTE known as the LTE-Advanced standard. Next generation mobile communications such as UMTS, LTE and LTE-Advanced aim to offer improved services to the user compared to the existing systems. These systems are expected to offer high data rate services for the processing and transmission of a wide range of information, such as voice, video and IP multimedia data. In the following, LTE-Advanced and further future generations of wireless communication systems is not mentioned separately, but included whenever "LTE" is mentioned. LTE is a technology for the delivery of high speed data services with increased data rates for the users. Compared to UMTS and previous generations of mobile communication systems, LTE will also offer reduced delays, increased cell edge coverage, reduced cost per bit, flexible spectrum usage and multi-radio access technology mobility.

The Evolved UTRAN is an evolution of the 3G UMTS radio-access network UTRAN towards a high-data-rate, low-latency and packet-optimized radio-access network in the LTE and LTE-Advanced technology. The E-UTRAN architecture is described, for example, in 3GPP TR 36.401, in particular section 6. The disclosure thereof is hereby incorporated by reference in the present application.

As in current UMTS systems, the basic architecture of LTE (and, consequently, of LTE-Advanced) consists of a radio access network (the E-UTRAN) connecting users (or, more precisely, user equipments, UEs) to access nodes (E-UTRAN Nodes B, eNBs) acting as base stations, these access nodes in turn being linked to a core network (the Evolved Packet Core, EPC). The eNBs provide E-UTRA (Evolved Universal Terrestrial Radio Access) user plane and control plane protocol terminations towards the UEs. The eNBs (the term "eNB" is interchangeably used with the term "access node", "access point" and "base station" in the present specification) may be interconnected with each other by means of a X2 interface. The eNBs are connected by means of a S1 interface to the EPC, more specifically to the MME (Mobile Management Entity) by means of a S1-MME and to the S-GW (Serving Gateway) by means of a S1-U. The S1 interface supports a many-to-many relation between MMEs/Serving Gateways and eNBs. Further details of the E-UTRAN radio interface protocol architecture are described, for example, in 3GPP TR 36.300, the disclosure thereof being hereby incorporated by reference in the present application.

An eNB may support FDD (Frequency Division Duplex) mode, TDD (Time Division Duplex) mode or dual mode operation. eNBs may be interconnected through the X2. The X2 may be a logical interface between two eNBs. Whilst logically representing a point to point link between eNBs, the physical realization needs not be a point to point link. The X2 interface is described in more detail, for example, in specification series 3GPP TS 36.42x (36.420, 36.421, 36.422, 36.423, 36.424), the disclosure thereof being hereby incorporated by reference in the present application.

In a typical LTE network, a UE is connected to an eNB by a radio interface Uu. eNBs are connected via a S1 interface to a core network (CN). eNBs are connected to the MMEs via a S1 control plane interface (S1-MME), which provides the control functions for, for example, Idle mode UE reachability and handover support. The User Plane (UP) data for the UE is routed via the eNBs to a S-GW via a S1 user plane interface (S1-U) interface.

A basic interaction between two nodes (such as two eNodeBs via the X2 interface, or between an eNodeB and the Evolved Packet Core via the S1 interface) is referred to as an Elementary Procedure (EP). An EP consists of an initiating message and optionally receiving a response. An example of an EP over the X2 interface is Handover Preparation as for example described in section 8.2.1 of 3GPP TS36.423, the disclosure thereof being hereby incorporated by reference in the present application.

In general, "handover" refers to any change in a UE's serving cell of a serving base station, whether or not involving a change in eNB (it is possible for one eNB to provide multiple cells depending on the antenna configuration). "Cell" refers to a radio network object as a combination of downlink and optionally uplink resources that can be uniquely identified by a UE from a (cell) identification that is broadcasted over a geographical area from one E-UTRAN Access Point. A Cell may be in FDD or TDD mode. In the present specification, "handover" usually refers to the process of a UE ceasing to be attached to a first, "source", eNB and instead becoming attached to a second, "target", eNB, thus transferring responsibility for the UE from the source to the target eNB (usually as a result of the UE having moved closer to the target eNB), although the present invention is not limited to this scenario.

The above discussion has so far mentioned only the eNB, the equivalent of the base station in earlier wireless communication systems, and which can serve many UEs in a relatively wide-area cell ("macro cell"). However, part of the LTE project is focussed on the possibility of deploying base station nodes on a much smaller geographical scale for homes or small businesses, each serving only a few UEs. This is the Home eNode B or HeNB, which corresponds to the so-called "femtocell" of some other proposals. Generally, the HeNB would define a small cell within a larger, overlaid macro cell, carrying out handover between a HeNB and the macro cell eNB as required to ensure a stronger signal to/from the UE, or merely to switch to a cheaper tariff. For example, use of the HeNB might be preferred when the user is within range of it, in order to reduce connection charges. In addition, the HeNB might be used to ensure that UEs can be reached in specific areas, such as underground or within the confines of a large building. Thus, although the HeNB cell would still be overlaid by the macro cell it could provide coverage for a "hole" in the macro cell.

Another example of a base station within the meaning of the present application is an e-UTRA Relay. From a UE perspective a relay node (also referred to as "relay base station" within the present specification) is part of the radio access network and behaves like an eNB. E-UTRAN supports relaying by having a Relay Node (RN) wirelessly connect to an eNB serving the RN, called Donor eNB (DeNB), via a modified version of the E-UTRA radio interface, the modified version being called the Un interface. The RN supports the eNB functionality meaning it terminates the radio protocols of the E-UTRA radio interface, and the S1 and X2 interfaces. Generally, functionality defined for eNBs, e.g. RNL and TNL, also applies to RNs. In addition to the eNB functionality, the RN also supports a subset of the UE functionality, e.g. physical layer, layer-2, RRC, and NAS functionality, in order to wirelessly connect to the DeNB. Details of support for relaying are described in 3GPP TS 36.300, for example, section 4.7. The disclosure thereof is hereby incorporated by reference in the present application.

Accordingly, a "base station" in the present specification refers to an entity in a radio access network responsible for radio transmission and reception in one or more cells to and from the UE. In LTE the base station is also known as the eNodeB.

In the following, examples of known handover procedures are described within the context of LTE. FIG. 1 illustrates an example of a mobile cellular network including a wireless communication system 1001. The mobile cellular network comprises the base stations, base stations 1100, 1200, 1300. As illustrated in FIG. 1, each of the base stations 1100, 1200, 1300 controls several cells. In the communication scenario as illustrated in FIG. 1, user equipment 1010 is currently communicating via a communication link with cell s (source cell) of (source) base station 1100. User equipment 1010 is surrounded by several neighbouring cells which are handover candidates for possible handover situations.

User equipment 1010 receives setup information relating to measurement procedures according to area restriction information from base station 1100 controlling the source cell s to which the user equipment 1010 is currently connected. When the user equipment 1010 moves away from source cell s the user equipment 1100 is triggered to send a measurement report in accordance with the setup information comprising rules set by, for example, system information, specification etc. to base station 1100. The user equipment 1010 may also be triggered to send a measurement report to the base station 1100 in other scenarios, such as change of channel conditions due to other reasons than the movement of the UE 1010.

Based on the measurement report received from user equipment 1010, source base station 1100 makes a decision whether or not to handover the user equipment 1010 to another cell, which may be another cell under control of base station 1100 or a cell under control of another base station such as base stations 1200 and/or 1300. If source base station 1100 decides to handover the user equipment 1010, it determines a target cell to which the communication link currently established between source cell s and UE shall be handed over.

The mobile cellular network supports handover mechanisms for providing service continuity of user equipment 1010 while it is handed over from source cell s to a target cell t due to, for example, user equipment's mobility across several borders of cells or changes of network conditions (in case, for example, the quality of the radio terminal used by the user equipment 1010 deteriorates). In known LTE mobile cellular networks, there are basically two ways for the source base station to prepare multiple cells for handover purposes, which are illustrated in FIGS. 2 and 3.

In a first known handover preparation procedure, illustrated in FIG. 2, the source base station 1100 initiates multiple handover preparation procedures towards different target base stations 1200 and 1300. Before the actual handover preparation procedure is started, user equipment 1010 transmits a measurement report to the source base station 1100. Upon determination that evaluation included in the measurement report indicates that a handover needs to be executed, the source base station 1100 makes a handover decision and sends handover request messages to target base stations 1200 and 1300. Thus, upon the receipt of the (one or more) measurement report(s), the source base station 1100 makes—if necessary or desired—the handover decision and initiates multiple handover preparation procedures by sending handover request messages to multiple target base stations 1200 and 1300 who control the target cells t which are indicated in the handover request messages. Target base stations 1200 and 1300 carry out admission control on the respective target cell t indicated in the handover request message. Thereafter, the target base stations 1200 and 1300 reply to the source base station 1100 with a list of admitted E-RABs based on the admission control on the target cell t.

An E-RAB uniquely identifies the concatenation of an S1 Bearer and the corresponding Data Radio Bearer. When an E-RAB exists, there is a one-to-one mapping between this E-RAB and an EPS (Evolved Packet System) bearer of the Non Access Stratum. The concept of "bearers" is important for achieving quality-of-service (QoS) in a packet-based network such as LTE. In general, a "bearer" can be thought of as an information transmission path of defined capacity, delay and bit error rate, etc. so as to enable a given service to be provided. Various types or levels of bearer can be established; for example a radio bearer (in LTE) is a service provided by layer 2 for transfer of user data between the UE and eUTRAN.

A second known handover procedure is illustrated in FIG. 3. FIG. 3 illustrates a handover preparation procedure, in which the source base station 1100 transmits handover preparation information regarding multiple cells under control of the same target base station 1200 to said target base station 1200 for handover preparation. As already explained with respect to FIG. 2, user equipment 1010 sends a measurement report to source base station 1100. Depending on the evaluation included in the measurement report, source base station 1100 decides about the handover. Thus, upon receipt of the measurement report, the source base station 1100 makes—if necessary or desired—the handover decision and initiates the handover preparation procedure by sending a handover request message to target base station 1200. The handover request message contains information about a target cell t under the control of the target base station 1200 and also contains information about the radio resource control (RRC) context. The RRC context contains re-establishment information which is needed at the target base station 1200 for the RRC connection re-establishment. Thus, the handover request message sent from the source base station 1100 to the target base station 1200 not only indicates the target cell t, but also contains a list of re-establishment cells r1, r2 (as illustrated in FIG. 1) that are candidate cells for the user equipment 1010 to fall back to in case of a handover failure with the target cell t. In the known handover procedure illustrated in FIG. 3, the target base station 1200 carries out admission control on the target cell t only which is indicated in the handover request message. The target base station 1200 then replies to the source base station 1100 with a list of admitted E-RABs based on the admission control carried out on the target cell t.

Thus, the source base station of, for example, a 3GPP mobile communication network can initiate multiple handover preparation procedures towards different target base stations as well as, within one handover preparation, can forward the handover preparation information for multiple cells under the same target base station for handover preparation.

However, there may be problems in the handover procedure thus causing a handover failure and a call drop. This deteriorates the quality of service and the quality of user experience. It is thus an object of certain embodiments to provide an improved handover procedure with increased quality of service and quality of user experience due to, for example, reducing the occurrence of call drops.

According to an aspect, a method for preparing a handover of a communications link in a mobile communication system, wherein said mobile communication system comprises a plurality of base stations and a user equipment, and wherein the communication link is established between the user equipment and a source base station of said plurality of base stations, comprises the steps of:

selecting a target cell and a re-establishment cell of at least one candidate handover base station of said plurality of base stations on the basis of a measurement report, said measurement report comprising measurements of attributes of cells of said plurality of base stations for a handover;
  initiating a handover preparation by transmitting a handover request from said source base station to said at least one candidate handover base station, wherein said handover request indicates the target cell and the re-establishment cell;
  carrying out admission control on the target cell and on the re-establishment cell;
  initiating the handover by transmitting a handover request acknowledgement from said at least one candidate handover base station to said source base station, wherein said handover request acknowledgement includes feedback information representing the admission control on the target cell and on the re-establishment cell; and
  updating the user equipment with the feedback information representing the admission control on the target cell and on the re-establishment cell.

The inventors recognized that there may be problems in the handover procedure causing a handover failure and a call drop when, for example, the cells prepared for re-establishment are not be suitable for the user equipment in handover. For example, a re-establishment cell may not be able to admit the user equipment because of limited available resource. If the user equipment tries to re-establish RRC connection in this kind of re-establishment cell during handover failure or after handover failure, although the user equipment may be able to connect to the cell, it will have to be handed over to another cell soon after the re-establishment. This deteriorates the quality of service and the quality of user experience.

The inventors found that, by introducing additional feedback information according to inventive embodiments, a handover preparation mechanism in a mobile communication system such as, for example, LTE or LTE-Advanced, can be enhanced. According to certain embodiments, the serving base station is adapted to collect feedback from the at least one candidate handover base station about the availability of the target cell(s) as well as of the re-establishment cell(s) and to update the user equipment in handover with this information, consequently increasing the success rate of handovers.

The at least one candidate handover base station may be one or more target base station(s). A target base station is a base station which controls a target cell. Similarly, a re-establishment base station is a base station which controls a re-establishment cell. However, for the ease of reference, the present specification uses the term "target base station" also for a base station controlling a re-establishment cell. In the case that the at least one candidate handover base station is one target base station, there is accordingly only one handover request and handover request acknowledgement. However, in the case that the at least one candidate handover base station comprises two (or more) target base stations, a corresponding number of handover requests and handover request acknowledgements may be provided. Preferably, the handover request message is the same (i.e. has the same content) for every target base station, but the handover request acknowledgement message differs for every target base station as it contains individual feedback information.

Reference herein to carrying out admission control includes reference to procedures at the candidate base station(s) which configure resources for communication. In a preferred embodiment, during admission control, the admission and/or rejection of new radio bearer establishment requests is controlled. The admission control may depend on the overall resource situation in an E-UTRAN, the QoS requirements, the priority levels, the provided QoS of in-progress sessions and the QoS requirements of new radio bearer requests.

In accordance with certain embodiments, the admission control on the re-establishment cell is carried out at substantially the same time as the admission control on the target cell, thus saving admission control time in case of a handover failure on the target cell. That is, the admission control on the re-establishment cell and the corresponding update of the UE with feedback information about the admission control on the re-establishment cell is carried out before the UE starts the handover procedure. Thus, the UE is updated with the feedback information representing the admission control on the target cell at substantially the same time as it is updated with the feedback information representing the admission control on the re-establishment cell. The handover preparation enhancement of certain embodiments thus contributes to improved quality of service and quality of user experience. The feedback mechanism according to certain embodiments improves the success rate of connection re-establishment and consequently reduces the overall call-drop rate due to handover failure and/or re-establishment failure. Thus, the quality of service and the quality of user experience is improved.

Known schemes allow the source base station to provide the target base station(s) with information on multiple cells, which include the target cell(s) and the re-establishment cell(s). In the acknowledgement messages sent to the source base station, the target base station of a known handover preparation scheme provides feedback based on the admission control on the target cell only. The inventors recognised that the risk of call drop and necessity of further handover procedures is related to the fact that the source base station does not provide feedback about the suitable cells in case of a re-establishment. The inventors recognised that in some cases the cells prepared for re-establishment may not be suitable for the user equipment handover, for example, the cell can not admit the user equipment because of limited available resource. If the user equipment tries to re-establish RRC connection in this kind of cell during/after handover failure, the user equipment may be able to connect to the cell, but it will have to be handed over to another cell soon after the re-establishment.

According to certain embodiments, the target base station provides feedback in the acknowledgement to the source base station that initiates the handover preparation for a UE. The feedback may include admission control information, such as the admitted E-RABs list, on, preferably all of, the cells included in the re-establishment list. In addition, the source base station may provide the UE, preferably in the handover message, with information based on the feedback information collected from, preferably all of, the target base stations during the handover preparation phase. In a preferred embodiment, the feedback information included in the handover request acknowledgement of a handover request acknowledgement sent from the target base station during the handover preparation procedure includes:

the admission control information on the target cell(s), and additional information, preferably admission control information, on the cell(s) included in the re-establishment list.

The feedback information, which may be a list of suitable cells for re-establishment, may then be used by the UE when it has to re-establish the radio connection due to a handover failure.

The "additional information on the cell(s) included in the re-establishment list" may be admission control information representing the admission control carried out on the re-establishment cell(s). However, embodiments of the present invention are not limited to feedback information representing the admission control on the target cell and on the re-establishment cell. The feedback information may also represent other additional information on re-establishment cell(s) indicating availability and/or suitability of the re-establishment cell(s) for a handover.

It is to be noted that although an aspect of the invention is explained with respect to a scenario in which the handover request indicates the target cell as well as the re-establishment cell of the same target base station, certain embodiments of the present invention also encompass a scenario in which the handover request indicates the re-establishment cell only. That is, certain embodiments of the invention are also applicable to a scenario in which the source base station transmits a first handover request indicating a target cell (and optionally a re-establishment cell) to a first target base station and transmits a second handover request indicating a re-establishment cell only to a second target base station. The first target base station carries out admission control on the target cell (and optionally on the re-establishment cell) and the second target base station carries out admission control on the re-establishment cell only. The first and second target base stations transmit the respective feedback information about the admission control to the source base station for updating the user equipment accordingly. Thus, the term "target base station" is not limited to one target base station, but shall also be understood as relating to two different target base stations, one controlling the target cell, and the other controlling the re-establishment cell.

Thus, certain embodiments of the present invention also encompass scenarios in which the source base station selects a target cell and a re-establishment cell of two (or more) target base stations. Accordingly, the method of embodiments of the present invention may comprise the steps of: selecting a target cell and a re-establishment cell of at least one target base station of said plurality of base stations on the basis of a measurement report, said measurement report comprising measurements of attributes of cells of said plurality of base stations for a handover; initiating a handover preparation by transmitting a handover request from said source base station to the at least one target base station, wherein said handover request indicates the target cell and the re-establishment cell; carrying out admission control on the target cell and on the re-establishment cell; initiating the handover by transmitting a handover request acknowledgement from the at least one target base station to said source base station, wherein said handover request acknowledgement includes feedback information representing the admission control on the target cell and on the re-establishment cell; and updating the user equipment with the feedback information representing the admission control on the target cell and on the re-establishment cell.

It is also noted that certain embodiments of the present invention also encompass that the handover request indicates more than one target cell and/or that the handover request indicates more than one re-establishment cell. Accordingly, the method of certain embodiments of the present invention may comprise: selecting at least one target cell and at least one re-establishment cell of at least one target base station of said plurality of base stations on the basis of a measurement report, said measurement report comprising measurements of attributes of cells of said plurality of base stations for a handover; initiating a handover preparation by transmitting a (one or more) handover request(s) from said source base station to the at least one target base station, wherein said handover request(s) indicates the at least one target cell and the at least one re-establishment cell; carrying out admission control on the at least one target cell and on the at least one re-establishment cell; initiating the handover by transmitting a (one or more) handover request acknowledgement(s) from the at least one target base station to said source base station, wherein said handover request acknowledgement(s) includes feedback information representing the admission control on the at least one target cell and on the at least one re-establishment cell; and updating the user equipment with the feedback information representing the admission control on the at least one target cell and on the at least one re-establishment cell.

Further, it is noted that the step of selecting a target cell and a re-establishment cell of at least one candidate handover base station of the plurality of base stations on the basis of a measurement report, preferably refers to selecting a target cell and a re-establishment cell of at least one candidate handover base station of the plurality of base stations on the basis of at least one measurement report. Accordingly, the source base station may take several measurement reports into account for selecting the target and/or re-establishment cell.

In a preferred aspect, the step of updating the user equipment with feedback information includes:

preparing a handover list of handover cells on the basis of the feedback information, wherein the target cell is the main entry of the handover list and the re-establishment cell is the auxiliary entry of the handover list; and transmitting the handover list of handover cells from the source base station to the user equipment for updating the user equipment.

The source base station may process the feedback information received from the target base station by preparing a handover list. The handover list lists the target cell and the re-establishment cell in an order which reflects the priority with which the user equipment shall execute handover. Thus, the main entry may be a first entry and the auxiliary entry may be a second entry. If there is more than one auxiliary entry, the $n^{th}$ auxiliary entry may be the $n+1^{th}$ entry of the handover list. That is, the user equipment starts handover to the target cell, which is the main entry in the handover list. Thereafter, the user equipment may start handover to the re-establishment cell, which is the auxiliary entry in the handover list. The user equipment may start handover to the auxiliary entry upon, for example, handover failure to the main entry or expiration of a pre-defined period in which the target cell of the main entry is not responding to a synchronization message sent from the user equipment to the target base station. By processing the feedback information at the source base station, additional processing means in form of hardware/software in the user equipment can be avoided. Further, by providing the user equipment with the readily prepared handover list, the user equipment can immediately start the handover to the target and the re-establishment cells as all the necessary information are present at the user equipment.

In a preferred aspect, the step of updating the user equipment with feedback information includes:

forwarding the feedback information from the source base station to the user equipment; and preparing a handover list of handover cells on the basis of the feedback information, wherein the target cell is the main entry of the handover list and the re-establishment cell is the auxiliary entry of the handover list.

The source base station may forward the feedback information to the user equipment for further processing. The user equipment may process the feedback information by preparing a handover list. The handover list lists the target cell and the re-establishment cell in an order which reflects the priority with which the user equipment executes handover. That is, the user equipment starts handover to the target cell, which is the main entry in the handover list. Thereafter, the user equipment may start handover to the re-establishment cell, which is the auxiliary entry in the handover list. The user equipment may start handover to the auxiliary entry upon, for example, handover failure to the main entry or expiration of a pre-defined period in which the target cell of the main entry is not responding to a synchronization message sent from the user equipment to the target base station. By forwarding the feedback information from the source base station to the user equipment, additional processing means in form of hardware/software in the source base station can be avoided. Further, by preparing the handover list in the user equipment, user equipment specific characteristics may be appropriately taken into account. Further, the user equipment may prepare the handover list during starting the handover with the target cell, thus having the handover list ready in case a handover failure occurs. By simultaneously starting handover to the target cell and preparing the handover list for the case a handover occurs, the period between handover failure and connection re-establishment can be reduced, thus reducing the risk of call drop.

In a preferred aspect, the method further comprises:

handing over the communication link to the target cell;

detecting a handover failure of handing over the communication link to the target cell; and handing over the communication link to the re-establishment cell.

Preferably, the steps of handing over the communication link depend on the entries of the handover list. That is, the first step of handing over the communication link is related to the main entry of the handover list and the second step of handing over the communication link is related to the auxiliary entry of the handover list. If there are more than one auxiliary entry in the handover list, the method may include further steps of handing over the communication link related to the more than one auxiliary entry of the handover list. "Handover failure" within the meaning of the present specification may also refer to a case in which no response to a synchronisation message is received.

In a preferred aspect, said feedback information comprises information about availability of the target cell and/or of the re-establishment cell and/or a list of admitted radio bearers on the re-establishment cell.

The feedback information may comprise any kind of information which may be necessary to hand the communication link from a source base station to another (target, relay, intermediate, home gateway etc.) base station. Preferably, the admission control procedure carried out on the re-establishment cell is the same admission control procedure as in a known admission control procedure carried out on a target cell. Accordingly, the feedback information representing the admission control on the re-establishment cell is preferably the same, i.e. comprises the same parameters, algorithm etc., as the feedback information representing the admission control on the target cell. Preferably, the feedback information represents an availability of the re-establishment cell to the user equipment, thus avoiding a scenario in which the user equipment tries to connect to an unavailable re-establishment cell. In further preferred embodiments, the feedback information comprises information representing at least one of the E-RABs to be set up, the QoS requirements of the E-RABs, the membership in, for example, a CSG (Closed Subscriber Group). The terms "available" and "suitable" refer to situations in which the cell comprises, for example, enough resources to accept the communication link and to provide reliable communication on the communication link. The availability and/or suitability of a cell may be determined on parameters, such as the E-RABs to be set up, the QoS requirements of the E-RABs, the membership in, for example, a CSG.

In a preferred aspect, the method comprises:

selecting the target cell and a plurality of re-establishment cells of the target base station on the basis of said measurement report, wherein said plurality of re-establishment cells includes the re-establishment cell;

initiating the handover preparation by transmitting the handover request from said source base station to said target base station, wherein said handover request indicates the target cell and said plurality of re-establishment cells;

carrying out admission control on the target cell and on said plurality of re-establishment cells;

initiating the handover by transmitting the handover request acknowledgement from said target base station to said source base station, wherein said handover request acknowledgement includes feedback information representing the admission control on the target cell and on said plurality of re-establishment cells; and
forwarding the feedback information from the source base station to the user equipment for updating the user equipment with feedback information representing the admission control on the target cell and on said plurality of re-establishment cells.

In a preferred aspect, the method further comprises:
preparing a handover list of handover cells on the basis of the feedback information, wherein the target cell is the main entry of the handover list, a first re-establishment cell of said plurality of re-establishment cells is the first auxiliary entry of the handover list and a second re-establishment cell of said plurality of re-establishment cells is the second auxiliary entry of the handover list.

As already mentioned above, certain embodiments of the present invention are not limited to a scenario with one re-establishment cell. It is preferred that the handover preparation method of certain embodiments of the present invention provides the user equipment with an update about a plurality of re-establishment cells, thus further improving the user equipment's knowledge about available re-establishment cells and reducing the rate of call-drops.

In a preferred aspect, the at least one candidate handover base station is a single target base station, and the method comprises:
selecting the target cell and the re-establishment cell of the target base station on the basis of the measurement report;
initiating the handover preparation by transmitting the handover request from said source base station to said target base station;
carrying out admission control on the target cell and on the re-establishment cell at the target base station;
initiating the handover by transmitting the handover request acknowledgement from said target base station to said source base station; and
updating the user equipment with the feedback information representing the admission control on the target cell and on the re-establishment cell of said target base station.

In a preferred aspect, the at least one candidate handover base station is a single target base station. The target base station may control one or a plurality of the re-establishment cells. In such an embodiment, the handover preparation communication between the source base station and the target base station comprises the handover request and the handover request acknowledgement only, thus providing a very simple and fast handover preparation.

In a preferred aspect, the at least one candidate handover base station comprises a first target base station and a second target base station, the target cell is a first target cell of said first target base station, the re-establishment cell is a first re-establishment cell of said first target base station, the handover request is a first handover request of said first target base station, the handover request acknowledgement is a first handover request acknowledgement of said first target base station and the feedback information is first feedback information of said first target base station, and the method further comprises:
selecting a second target cell and a second re-establishment cell of the second target base station of said plurality of base stations on the basis of the measurement report;
initiating the handover preparation by transmitting a second handover request from said source base station to said second target base station, wherein said second handover request indicates the second target cell and the second re-establishment cell;
carrying out admission control on the second target cell and on the second re-establishment cell;
initiating the handover by transmitting a second handover request acknowledgement from said second target base station to said source base station, wherein said second handover request acknowledgement includes second feedback information representing the admission control on the second target cell and on the second re-establishment cell; and
updating the user equipment with the second feedback information representing the admission control on the second target cell and on the second re-establishment cell.

As already mentioned above, certain embodiments of the present invention are not limited to a scenario with one target base station. It is preferred that the user equipment is updated about at least one target cell and at least one re-establishment cell of at least one target base station. The user equipment may be updated by first and second feedback information received from first and second target stations. It is also preferred that the user equipment is updated by combined feedback information which is based on first and second feedback information of from first and second target stations. Preferably, the source base station processes the first and second feedback information to provide the user equipment with the combined feedback information. The source base station and/or the user equipment may prepare a handover list on the basis of the combined feedback information. By taking not only one, but a plurality of target base stations into account when updating the user equipment with feedback information, the user equipment's knowledge about available re-establishment cells can be further improved, thus reducing the rate of call-drops.

In a preferred aspect, the method further comprises:
initiating the handover preparation by transmitting the handover request from said source base station to an intermediate base station; and
forwarding said handover request from said intermediate base station to the at least one candidate handover base station.

In a preferred aspect, the method further comprises:
transmitting the handover request acknowledgement from said at least one candidate handover base station to an intermediate base station; and
forwarding said handover request acknowledgement from said intermediate base station to the source base station.

In a preferred aspect, the method further comprises:
carrying out admission control on a cell of an intermediate base station;
initiating the handover by transmitting a combined handover request acknowledgement from said intermediate base station to said source base station, wherein said combined handover request acknowledgement includes the feedback information representing the admission control on the target cell and on the re-establishment cell of the at least one candidate handover base station and feedback information representing the admission control on the cell of the intermediate base station; and
updating the user equipment with the feedback information representing the admission control on the target cell and on the re-establishment cell of the at least one candidate handover base station and with the feedback information representing the admission control on the cell of the intermediate base station.

In a preferred aspect, the method further comprises:
selecting a cell of an intermediate base station on the basis of said measurement report; and
initiating the handover preparation by transmitting a combined handover request from said source base station to said intermediate base station, wherein said combined handover request indicates the target cell and the re-establishment cell of the target base station and the cell of the intermediate base station.

Preferably, the handover preparation method of embodiments of the present invention is applicable to LTE and LTE-Advanced. However, "base station" within the meaning of the present specification is not limited to eNB, but may also refer devices of relays, femtos or other, preferably wireless, communication systems. In a preferred embodiment, the method is applicable in a relaying network, in which the "intermediate base station" relates to a donor eNB and the "target base station" relates to a relay. The term "cell of the intermediate base station" may refer to a target cell and/or to a re-establishment cell. In a further preferred embodiment, the method of embodiments of the present invention may also be applicable to an access network consisting of multiple cells with different characteristics (for example, a variety of e-NodeBs, Home e-NodeBs, e-UTRA Relays). Accordingly, embodiments of the present invention also encompass a handover preparation method comprising a step of update the user equipment with feedback information representing admission control on a (or more) target cell and on a (or more) re-establishment cell, wherein the target cell may have first characteristics (for example e-NodeB, Home e-NodeB, e-UTRA Relay) and the re-establishment cell may have second characteristics (for example e-NodeB, Home e-NodeB, e-UTRA Relay), wherein the first and second characteristics are different.

In another aspect, the present invention relates to a mobile communication system comprising a plurality of base stations and a user equipment, wherein a communication link is established between the user equipment and a source base station of said plurality of base stations, the mobile communication system includes a handover control unit comprising:
  a cell selection unit for selecting a target cell and a re-establishment cell of at least one candidate handover base station of said plurality of base stations on the basis of a measurement report, said measurement report comprising measurements of attributes of cells of said plurality of base stations for a handover;
  a handover preparation unit for initiating a handover preparation by transmitting a handover request from said source base station to said at least one candidate handover base station, wherein said handover request indicates the target cell and the re-establishment cell;
  an admission control unit for carrying out admission control on the target cell and on the re-establishment cell;
  a handover unit for initiating the handover by transmitting a handover request acknowledgement from said at least one candidate handover base station to said source base station, wherein said handover request acknowledgement includes feedback information representing the admission control on the target cell and on the re-establishment cell; and
  an updating unit for updating the user equipment with the feedback information representing the admission control on the target cell and on the re-establishment cell.

In another aspect, the present invention relates to a base station for use as a source base station in a wireless communication system, the mobile communication system comprising a plurality of base stations and a user equipment, wherein a communication link is established between the user equipment and the source base station of said plurality of base stations, the base station comprising:
  a cell selection unit for selecting a target cell and a re-establishment cell of a at least one candidate handover base station of said plurality of base stations on the basis of a measurement report, said measurement report comprising measurements of attributes of cells of said plurality of base stations for a handover;
  a handover request transmission unit for initiating a handover preparation by transmitting a handover request to said at least one candidate handover base station, wherein said handover request indicates the target cell and the re-establishment cell;
  a handover unit for initiating the handover when receiving a handover request acknowledgement from said at least one candidate handover base station, wherein said handover request acknowledgement includes feedback information representing the admission control on the target cell and on the re-establishment cell; and
  an updating unit for updating the user equipment with the feedback information representing the admission control on the target cell and on the re-establishment cell.

In another aspect, the present invention relates to a base station for use as a candidate handover base station in a wireless communication system, the mobile communication system comprising a plurality of base stations and a user equipment, wherein a communication link is established between the user equipment and a source base station of said plurality of base stations, the base station comprising:
  a handover preparation unit for initiating a handover preparation when receiving a handover request from said source base station, wherein said handover request indicates a target cell and a re-establishment cell of the candidate handover base station for a handover;
  an admission control unit for carrying out admission control on the target cell and on the re-establishment cell; and
  a handover request acknowledgement transmission unit for initiating the handover by transmitting a handover request acknowledgement to said source base station, wherein said handover request acknowledgement includes feedback information representing the admission control on the target cell and on the re-establishment cell.

In another aspect, the present invention relates to a base station for use as a source base station of the present invention as well as for use as a target base station of the present invention.

In another aspect, the present invention relates to a user equipment for use in a method for preparing a handover of a communications link according to the present invention. In a preferred embodiment, the user equipment comprises:
  a measurement report transmission unit for transmitting a measurement report to said source base station via said communication link, said measurement report comprising measurements of attributes of cells of said plurality of base stations for a handover; and
  a feedback information reception unit for receiving feedback information representing an admission control on a target cell and on a re-establishment cell of at least one candidate handover base station of the handover.

In another aspect, the present invention relates to a computer readable medium storing program code for, when executed, causing a computer to perform the method of the present invention. In another aspect, the present invention relates to a computer software comprising program code for, when executed, causing a computer to perform the method of the present invention.

In the following, reference is made, by way of example only, to drawings for exemplifying preferred embodiments of the present invention, in which.

Figure 7:
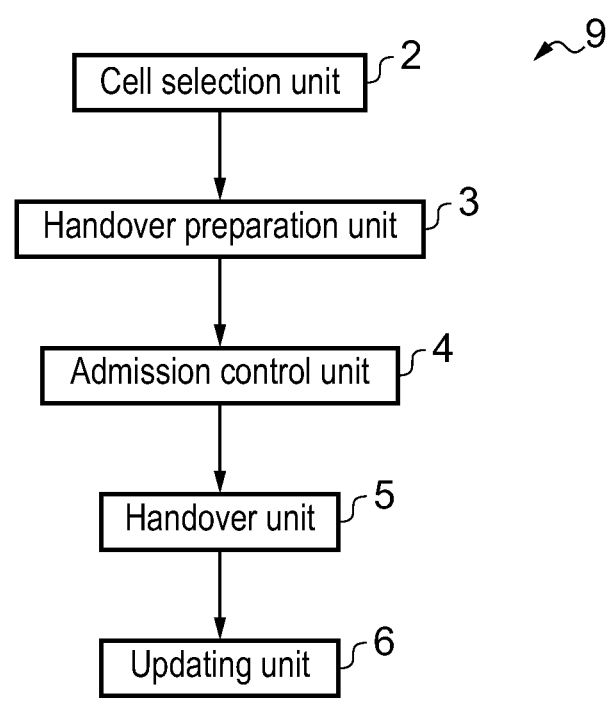
Figure 8:
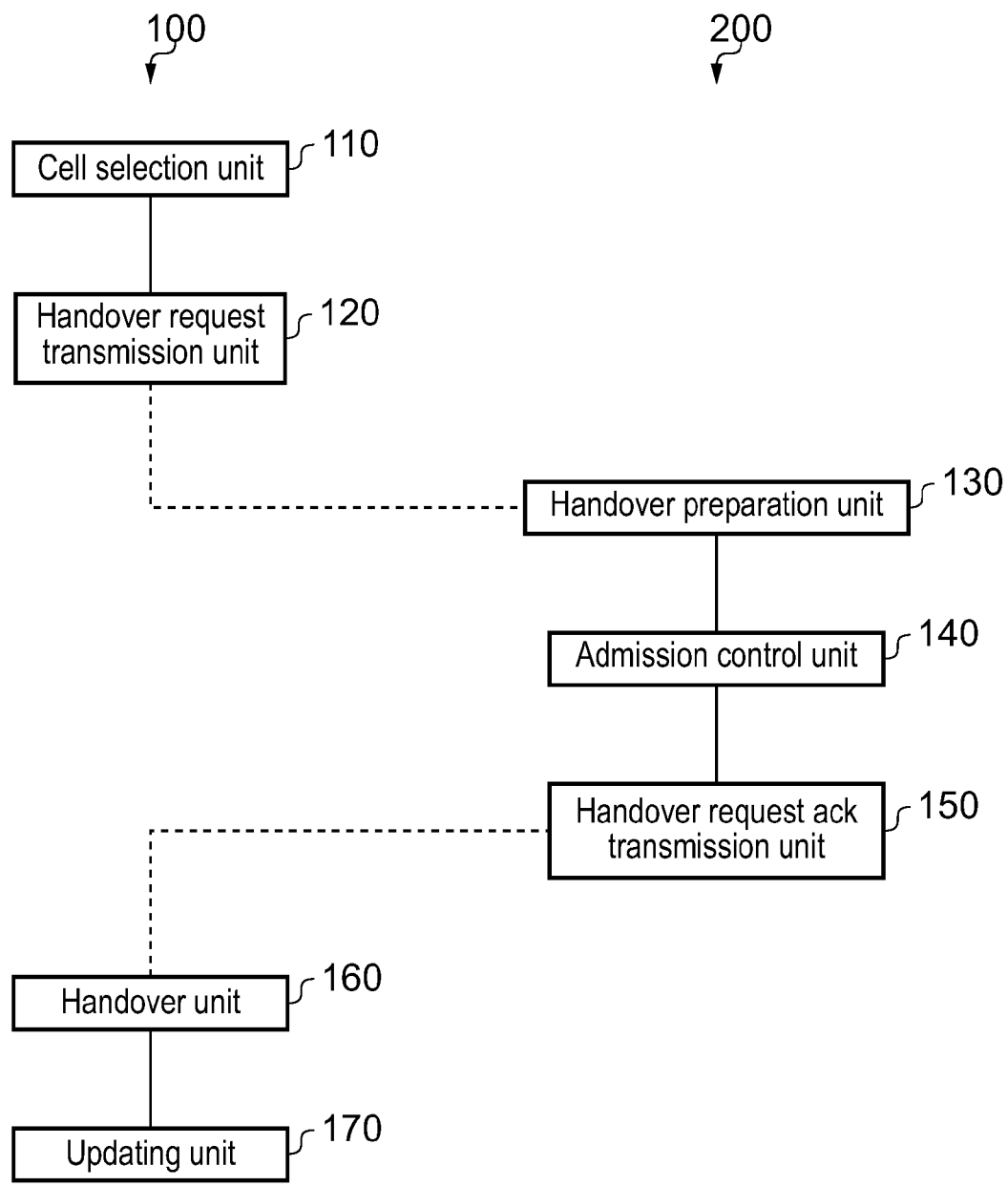
Figure 9:
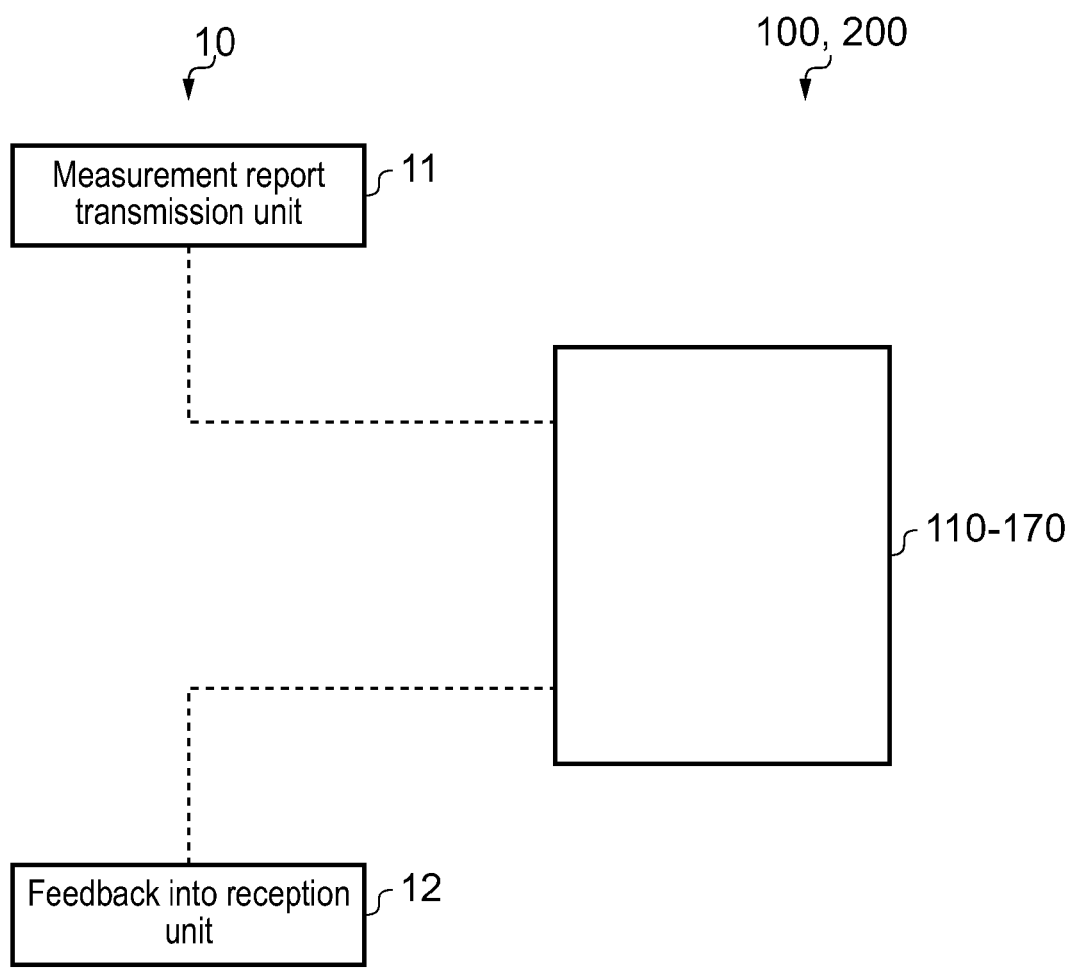

FIG. 7 schematically illustrates an embodiment of a wireless communication system, FIG. 8 schematically illustrates an embodiment of a source base station and a target base station, and FIG. 9 schematically illustrates an embodiment of the user equipment and the source/target base station.

Figure 4:
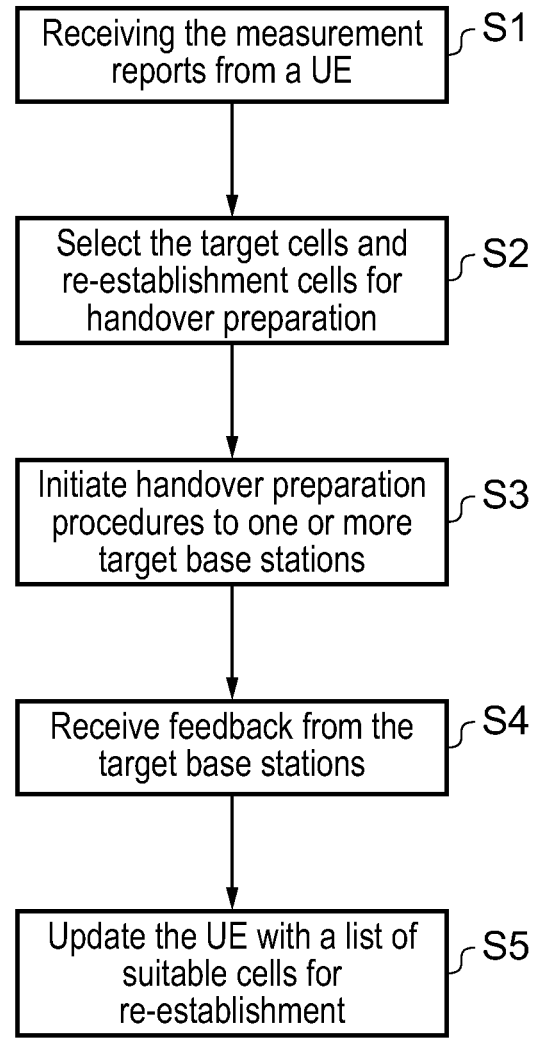
FIG. 4 is a flow diagram of an embodiment of the handover preparation method.

FIG. 4 schematically illustrates a preferred embodiment of the handover preparation procedure as carried out by a base station of a mobile communication system. In step S1, a source base station 100 receives measurement report(s) from a user equipment 10. In step S2, the source base station 100 selects the target cell(s) t and at least one, preferably more than one, re-establishment cells r1, r2 for handover preparation. In step S3, the source base station 100 initiates the handover preparation procedures to one or more target base stations 200, 300. The handover preparation procedures are preferably initiated by transmitting a handover request message to the one or more target base stations 200, 300 as is explained below.

In step S4, the source base station 100 receives feedback from the target base stations 200, 300. The feedback is preferably included in a handover request acknowledgement message. This feedback not only comprises information about the admission control of the target cell t, but also comprises information about the admission control on the one or more re-establishment cells r1, r2. Accordingly, the source base station 100 updates the user equipment 10 with a list of suitable cells r1, r2 for re-establishment in step S5. The determination of the list of suitable cells r1, r2 for re-establishment may be executed within the source base station 100 or the user equipment 10 itself.

Thus, the user equipment 10 which is updated with feedback information about admission control of the target cell t as well as of the one or more re-establishment cells r1, r2 may immediately fall back to one of the re-establishment cells r1, r2 in case of a handover failure. The user equipment 10 does not need to exchange further handover control information with the source and/or target base stations 100, 200, 300 as all the information necessary for a handover to the one or more re-establishment cells r1, r2 is already available at the user equipment 10. Thus, the time for successfully handing over to an available cell can be reduced, thus improving user experience and avoiding a call drop.

Figure 5:
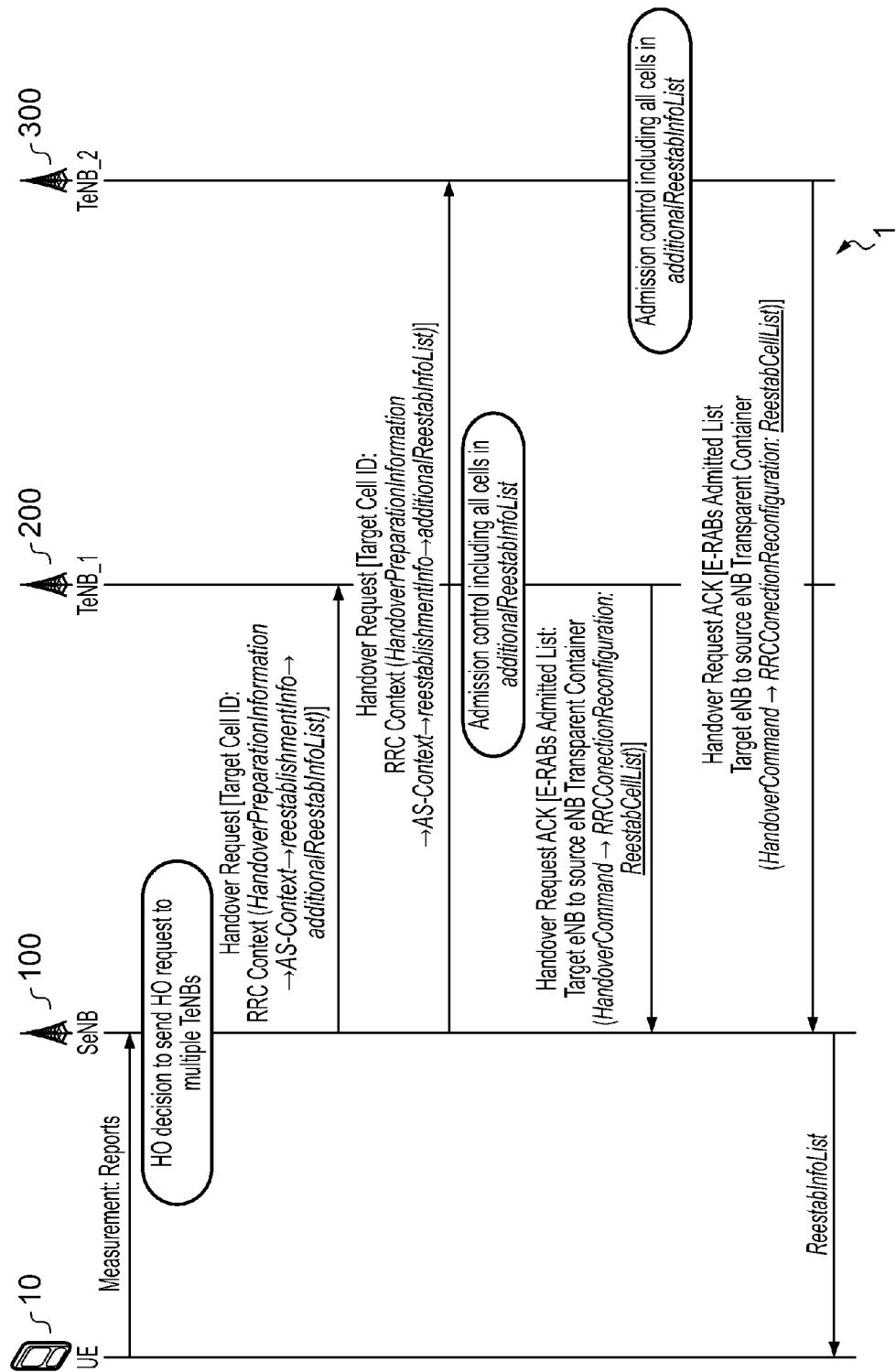
FIG. 5 illustrates a first embodiment of a handover preparation procedure.
Figure 6:
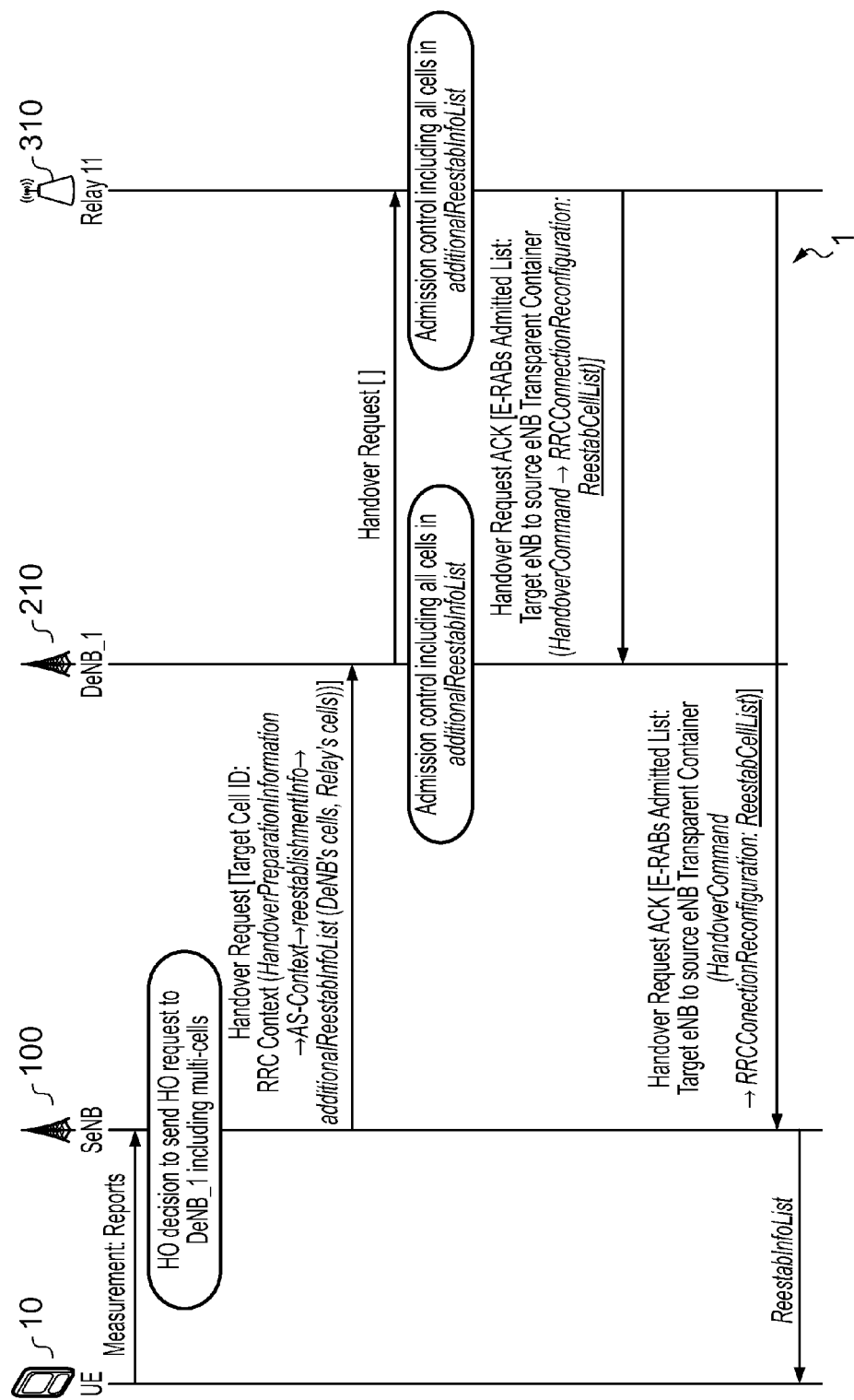
FIG. 6 shows a second embodiment of a handover preparation procedure.

FIGS. 5 and 6 illustrate embodiments. In the first preferred embodiment, illustrated in FIG. 5 and based on LTE, the wireless communication network 1 comprises multiple base stations 100, 200, 300, each controlling more than one cell. Upon receipt of a measurement report sent by a user equipment 10 of the wireless communication network 1, the source base station 100 selects one or more target base stations 200, 300 for handover preparation.

The source base station 100 initiates multiple handover preparation procedures towards several target base station 200, 300 by transmitting handover request messages. The handover request message includes information about a target cell (identified by a target cell ID), and may comprise RRC context. The RRC context comprises handover preparation information, AS context, re-establishment information, and an additional re-establishment information list. Accordingly, in each of the handover request messages transmitted from source base station 100 to target base stations 200, 300, the target cell is indicated by "target cell ID" and a list of re-establishment cells is also included. This procedure basically corresponds to a known handover preparation as, for example, described in sections 10.2 and 10.3 of 3GPP TS 36.331, the disclosure thereof is hereby incorporated by reference in the present application.

However, in contrast to a known handover preparation, the target base stations 200, 300 not only perform admission control on the target cell t, but also on the re-establishment cells r1, r2. By carrying out the admission control on the target cell t as well as on at least one re-establishment cell r1, r2, the user equipment 10 is enabled to immediately fall back to a readily prepared and available re-establishment cell r1, r2 as the user equipment 10 has all information which is necessary to re-establishment the radio connection upon handover failure with the target cell t.

As illustrated in FIG. 5, the results of the admission control on the target cell t as well as on the re-establishment cell r1, r2 are communicated back to the source base station 100 in the form of feedback included in a handover command included in the handover request acknowledgement message. In FIG. 5, the feedback is indicated as "ReestabCellList". The source base station 100 then updates the user equipment 10 in handover with a list of suitable cells r1, r2 for re-establishment by providing the user equipment 10 with the "ReestabCellList".

FIG. 6 shows a second preferred embodiment of the handover preparation procedure. The second embodiment is similar to the first embodiment except that the multiple handover preparation procedure is explained in the context of relay and femto scenarios. The cells of relay stations or femto stations may be treated as the ones of its proxy, for example, sharing the same eNB ID, that is a donor eNB in case of relays and a home eNB gateway in case of femtos. Accordingly, a donor eNB as well as a home eNB gateway may be identified with a target base station within the meaning of the present specification.

FIG. 6 shows an embodiment of a multiple handover preparation procedure in a relaying network. Although an embodiment relating to a femto network is not illustrated, the same principles as explained with respect to an LTE scenario or relaying scenario may be applied. Specifically, in a femto scenario, the donor eNB of the relaying scenario of FIG. 6 may be replaced by a home eNB gateway of a femto scenario.

The source base station 100 illustrated in FIG. 6 initiates the handover preparation to a donor ENB (DeNB) 210 and relay station 310 by transmitting a handover request to donor eNB 210. In the handover request message, an additional re-establishment information list is included which indicates the target cells t and the one or more re-establishment cells r1, r2 of the donor eNB 210 as well as of the relay station. As the additional re-establishment information list also indicates cells of relay station 310, the donor eNB forwards the handover request message to the relay station 310. The relay station 310 as well as the donor eNB 210 perform admission control on the cells r1, r2 indicated in the re-establishment cells list. The relay station 310 transmits a handover request acknowledgement to the donor eNB 210, wherein the handover request acknowledgement includes feedback information representing the admission control on cells r1, r2 indicated in the re-establishment cells list. The donor ENB 210 then replies to the source base station 100 with the handover request acknowledgement with a combined feedback ("ReestabCellList") from itself and the relay station 310. The source base station 100 then updates the user equipment 10 with information about suitable cells for re-establishment by means of the "ReestabCellList".

Figure 1:
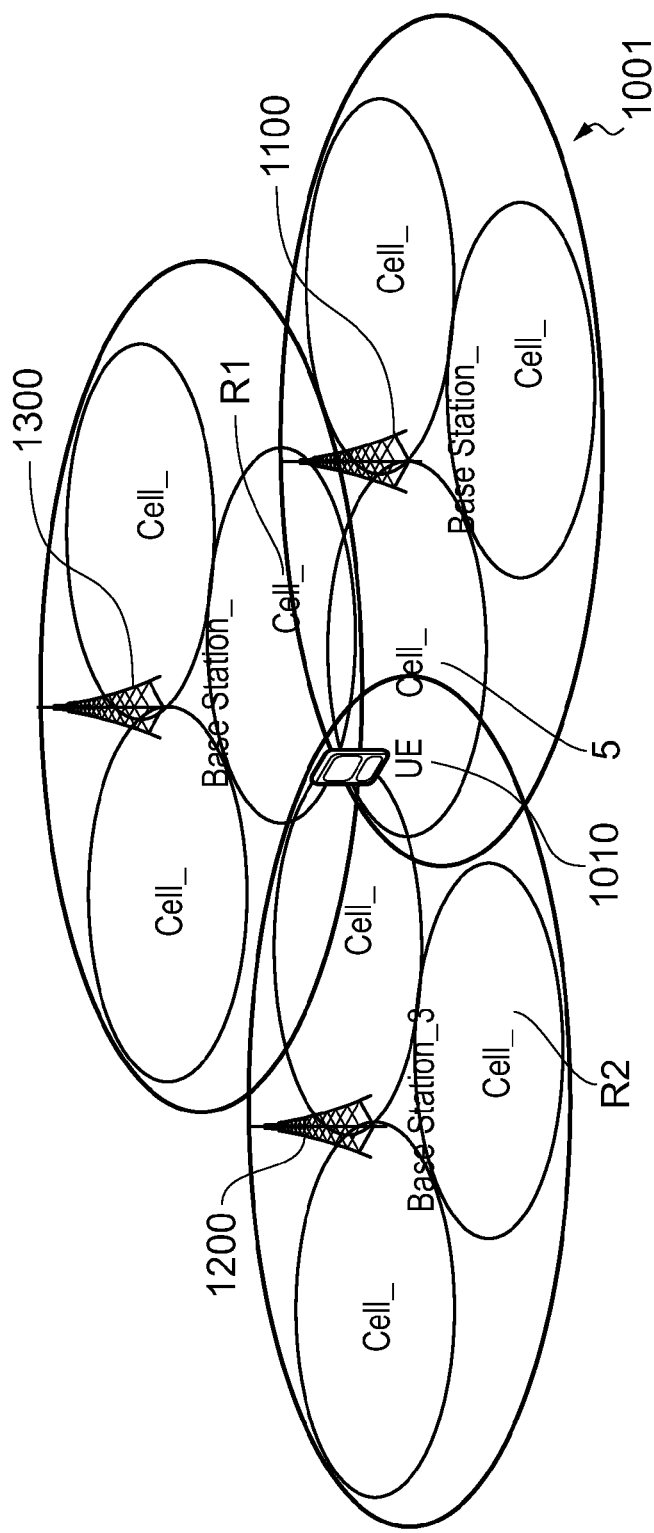
FIG. 1 illustrates a wireless communication architecture of LTE.
Figure 2:
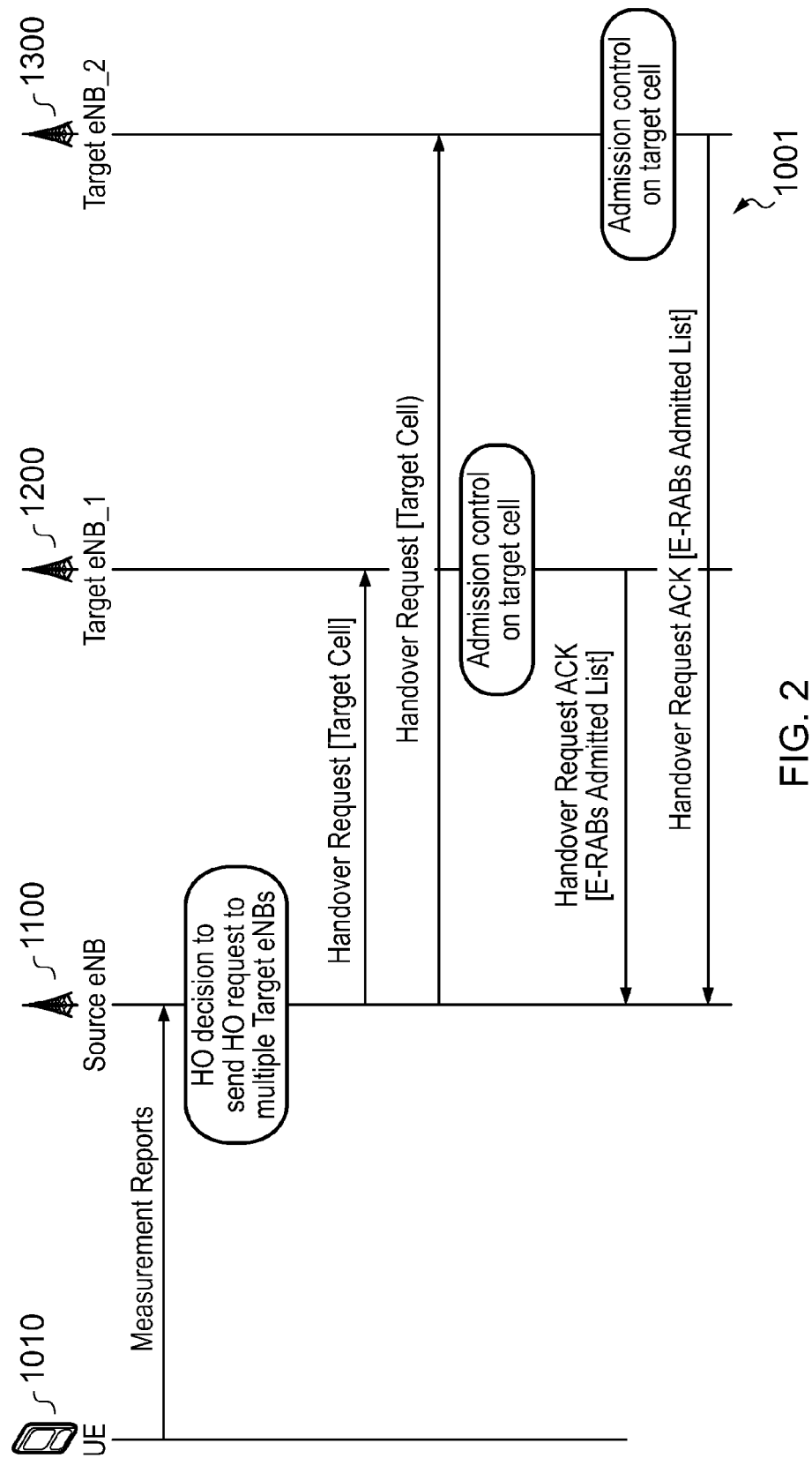
FIG. 2 illustrates a first example of a known handover preparation procedure.
Figure 3:
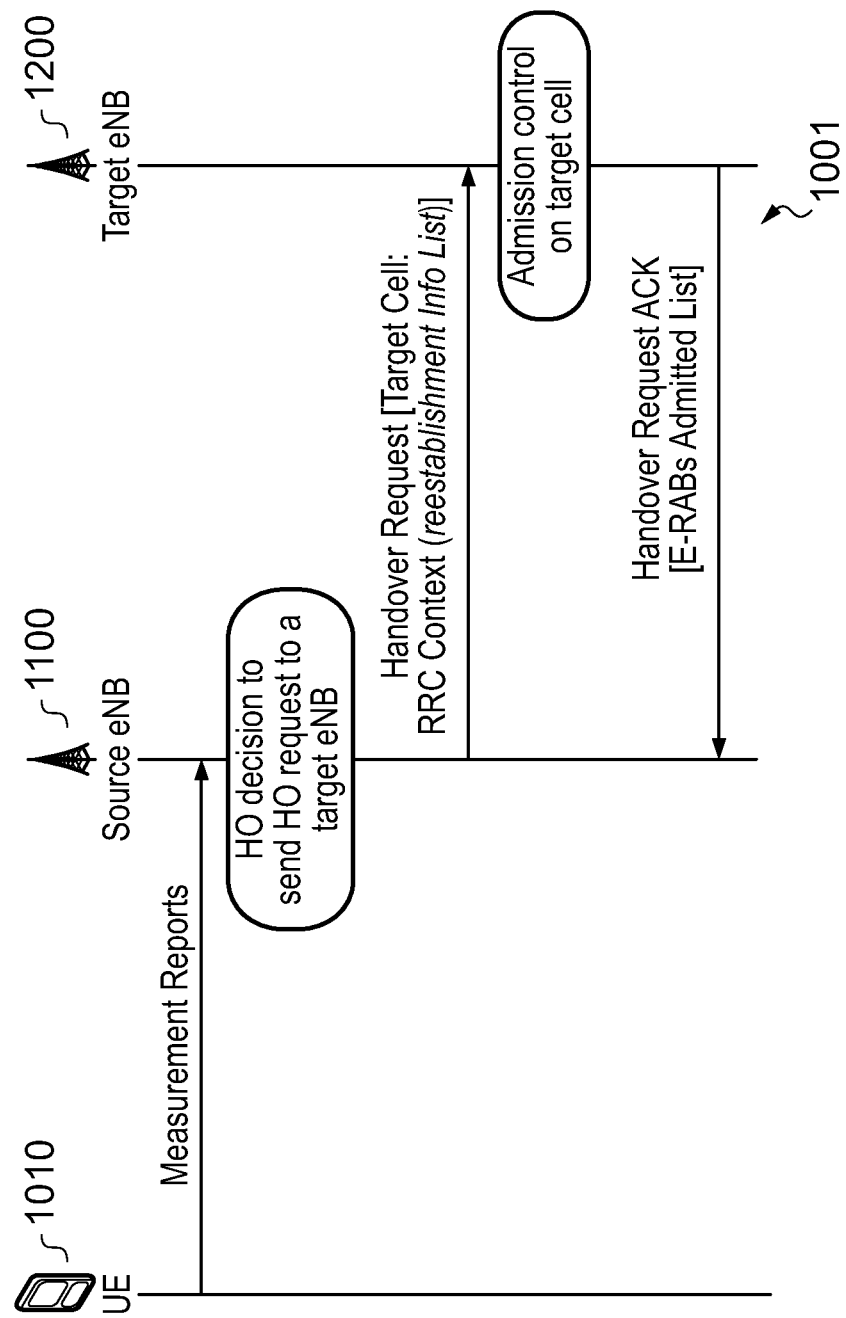
FIG. 3 illustrates a second example of a known handover preparation procedure.

FIG. 7 schematically illustrates an embodiment of a wireless communication system 1. Analogously as already explained with respect to FIG. 1, a mobile communication system 1 comprises a plurality of base stations 100, 200, 210, 300, 310 and a user equipment 10. A communication link is established between the user equipment 10 and a source base station 100 of said plurality of base stations.

As illustrated in the embodiment of FIG. 7, the mobile communication system 1 of an embodiment includes a handover control unit 9. The handover control unit 9 comprises a cell selection unit 2 for selecting a target cell and a re-establishment cell of a target base station 200, 210, 300, 310 of said plurality of base stations on the basis of a measurement report, said measurement report comprising measurements of attributes of cells of said plurality of base stations for a handover. The handover control unit 9 further comprises a handover preparation unit 3 for initiating a handover preparation by transmitting a handover request from said source base station to said target base station, wherein said handover request indicates the target cell and the re-establishment cell. The handover control unit 9 further comprises an admission control unit 4 for carrying out admission control on the target cell and on the re-establishment cell. The handover control unit 9 further comprises a handover unit 5 for initiating the handover by transmitting a handover request acknowledgement from said target base station to said source base station, wherein said handover request acknowledgement includes feedback information representing the admission control on the target cell and on the re-establishment cell. The handover control unit 9 further comprises an updating unit 6 for updating the user equipment with the feedback information representing the admission control on the target cell and on the re-establishment cell.

FIG. 8 schematically illustrates an embodiment of a source base station 100 and a target base station 200. The source base station 100 comprises a cell selection unit 110 for selecting a target cell and a re-establishment cell of the target base station 200 on the basis of a measurement report, said measurement report comprising measurements of attributes of cells of a plurality of base stations for a handover. The source base station 100 further comprises a handover request transmission unit 120 for initiating a handover preparation by transmitting a handover request to said target base station 200, wherein said handover request indicates the target cell and the re-establishment cell.

The target base station 200 comprises a handover preparation unit 130 for initiating a handover preparation when receiving a handover request from said source base station 100, wherein said handover request indicates a target cell and a re-establishment cell of the target base station for a handover. The target base station 200 further comprises an admission control unit 140 for carrying out admission control on the target cell and on the re-establishment cell. The target base station 200 further comprises a handover request acknowledgement transmission unit 150 for initiating the handover by transmitting a handover request acknowledgement to the source base station 100, wherein said handover request acknowledgement includes feedback information representing the admission control on the target cell and on the re-establishment cell.

The source base station 100 further comprises a handover unit 160 for initiating the handover when receiving a handover request acknowledgement from said target base station 200, wherein said handover request acknowledgement includes feedback information representing the admission control on the target cell and on the re-establishment cell. The source base station 100 further comprises an updating unit 170 for updating the user equipment 10 with the feedback information representing the admission control on the target cell and on the re-establishment cell.

Usually, the source base station 200 and the target base station relate to functions which are carried out by the same base station. Thus, a base station of further preferred embodiment comprises all the features which are described herein separately with respect to the functions of a source and a target base station. Thus, a base station of the preferred embodiment is adapted for being a source as well as a target base station within the meaning of the present specification.

FIG. 9 schematically illustrates an embodiment of the user equipment 10 and the source/target base station 100, 200. The user equipment 10 comprises a measurement report transmission unit 11 for transmitting a measurement report to the source base station 100 via the communication link, said measurement report comprising measurements of attributes of cells of a plurality of base stations for a handover. The user equipment 10 further comprises a feedback information reception unit 12 for receiving feedback information representing an admission control on a target cell t and on a re-establishment cell r1, r2 of a target base station 200 of the handover. In FIG. 9, source base station 100 and target base station 200 are illustrated as a combined entity whose details are illustrated in FIG. 8.

As explained above, certain embodiments are specifically adapted for implementation in LTE-Advanced. An accordingly preferred embodiment is set out in the following with reference to 3GPP TS 36.300, section 10.1.2, the disclosure thereof being hereby incorporated by reference in the present application.

According to the preferred embodiment, the "handover request" corresponds to the Handover Preparation Information message included in the HANDOVER REQUEST as described in sections 8.2.1 and 9.1.1.1 of 3GPP TS 36.423 and the "handover request acknowledgement" corresponds to the HANDOVER REQUEST ACKNOWLEDGE and includes a Handover Command as described in sections 8.2.1 and 9.1.1.2 of 3GPP TS 36.423.

The handover procedure may be performed without EPC involvement, i.e. preparation messages may be directly exchanged between the eNBs 100, 200, that is the source base station 100 and the target base station 200, preferably via the X2 interface. In the following, an example of an intra-MME/Serving Gateway handover procedure of LTE-Advanced is provided:

1. The source eNB 100 configures the UE measurement procedures according to, for example, area restriction information. Measurements provided by the source eNB 100 may assist the function controlling the UE's connection mobility.

2. The UE 10 is triggered to send a measurement report to the source base station 100 by rules set by, for example, system information, specification etc.

3. The source eNB 100 decides based on the received measurement report and, optionally further information such as RRM information, to handover the UE 10 to another base station.

4. The source eNB 100 issues a handover request message to the target eNB 200 passing information to prepare the handover at the target side. These information may include UE X2 signalling context reference at source eNB, UE S1 EPC signalling context reference, target cell ID, KeNB*, RRC context including the C-RNTI of the UE in the source eNB, AS-configuration, E-RAB context and physical layer ID of the source cell+MAC for possible RLF recovery. UE X2/UE S1 signalling references enable the target eNB 200 to address the source eNB 100 and the EPC. The E-RAB context includes RNL (Radio Network Layer) and TNL (Transport Network Layer) addressing information, and QoS profiles of the E-RABs. For further details, it is referred to 3GPP TS 36.300, section 10.1.2 and its references.

The RNL encompasses the radio network control plane and the radio network user plane. It handles Radio Access Bearer-related functions.

The TNL establishes physical and logical connections between the Radio Access Network (RAN) and the Core Network (CN). It comprises the transport network control plane and the transport network user plane.

In the case of a UE 10 under an RN (relay node) performing handover, the handover request is received by a DeNB 210, which reads the target cell ID from the message, finds the target eNB 310 corresponding to the target cell ID, and forwards the X2 message toward the target eNB 310.

In the case of a UE 10 performing handover toward an RN, the handover request is received by the DeNB 210, which reads the target cell ID from the message, finds the target RN 310 corresponding to the target cell ID, and forwards the X2 message toward the target RN 310.

5. Admission Control may be performed by the target eNB 200 dependent on the received E-RAB QoS information to increase the likelihood of a successful handover, if the resources can be granted by target eNB 200. The target eNB 200 configures the required resources according to the received E-RAB QoS information and reserves a C-RNTI (Cell Radio Network Temporary Identifier) and optionally a RACH (Random Access Channel) preamble.

In accordance with an embodiment, this step is modified by carrying out admission control which is described above with reference to the target cell t also on at least one re-establishment cell r1, r2.

A C-RNTI is an UE identifier allocated by an eNodeB and unique within one cell controlled by that eNodeB. The C-RNTI can be reallocated when a UE 10 moves to a new cell.

A RACH is a transport channel used for access to the network when the UE 10 does not have accurate uplink timing synchronization, or when the UE does not have any allocated uplink transmission resource. The RACH is normally contention-based, which may result in collisions between UEs 10.

The AS (Access Stratum)-configuration to be used in the target cell t can be specified independently (i.e. an "establishment") or as a delta compared to the AS-configuration used in the source cell s (i.e. a "reconfiguration").

6. The target eNB 200 prepares handover with layers L1/L2 and sends the handover request acknowledge to the source eNB 100. The handover request acknowledge message includes a transparent container to be sent to the UE 10 as an RRC (Radio Resource Control) message to perform the handover. The container includes a new C-RNTI, target eNB security algorithm identifiers for the selected security algorithms, and it may also include a dedicated RACH preamble, and possibly some other parameters i.e. access parameters, SIBs, etc. The handover request acknowledge message may also include RNL/TNL information for the forwarding tunnels, if necessary.

In accordance with an embodiment, this step is modified by the transparent container also including parameters of the admission control on the at least one re-establishment cell r1, r2.

RRC is in part a sublayer of radio interface Layer 3 existing in the control plane only which provides information transfer service to the non-access stratum. RRC is responsible for controlling the configuration of radio interface Layers 1 and 2.

When the source eNB 100 receives the handover request acknowledge, or when the transmission of the handover command is initiated in the downlink, data forwarding may be initiated.

7. The target eNB 200 generates the RRC message to perform the handover, which is the RRCConnectionReconfiguration message including the mobilityControlInformation, to be sent by the source eNB 100 towards the UE 10. The source eNB 100 performs integrity protection and ciphering of the message. The UE 10 receives the RRCConnectionReconfiguration message with parameters (e.g. new C-RNTI, target eNB security algorithm identifiers, and optionally dedicated RACH preamble, target eNB SIBs, etc.) and is commanded by the source eNB 100 to perform the handover.

In accordance with an embodiment, this step is modified by the parameters of the RRCConnectionReconfiguration message also relating to the at least one re-establishment cell r1, r2.

For further details about next steps of the handover procedure it is referred to 3GPP TS 36.300, section 10.1.2 and its references. For further details of LTE and LTE-Advanced it is specifically referred to the protocol specification of the Radio Resource Control (RRC) as described in 3GPP 36.331, the S1 Application Protocol as described in 3GPP 36.413 and the X2 Application Protocol as described in 3GPP 36.423. The disclosure of these documents is hereby incorporated by reference in the present application.

What is claimed is:

1. A method for preparing a handover of a communications link in a mobile communication system, said mobile communication system comprising a plurality of base stations and a user equipment, wherein the communication link is established between the user equipment and a source base station of said plurality of base stations, the handover method comprising:

selecting a target cell controlled by a target base station from among the plurality of base stations and a re-establishment cell controlled by a re-establishment base station from among the plurality of base stations and different from the target base station on the basis of a measurement report, said measurement report comprising measurements of attributes of cells of said plurality of base stations for a handover;

initiating a handover preparation by transmitting a handover request from said source base station to said target base station and from said source base station to said re-establishment base station, wherein said handover request indicates the target cell and the re-establishment cell;

carrying out admission control on the target cell and on the re-establishment cell;

initiating the handover by transmitting a handover request acknowledgement from said target base station to said source base station and transmitting a different handover request acknowledgment from said re-establishment base station to said source base station, wherein said handover request acknowledgement includes feedback information representing the admission control on the target cell and the availability of the target cell, and wherein said different handover request acknowledgment includes feedback information representing the admission control on the reestablishment cell and the availability of the re-establishment cell; and updating the user equipment with the feedback information included in the handover request acknowledgement from the target base station and in the different handover request acknowledgement from the reestablishment base station;

wherein said updating the user equipment with the feedback information further includes:
  forwarding the feedback information from the source base station to the user equipment; and
  preparing a handover list of handover cells on the basis of the feedback information, wherein the target cell is a main entry of the handover list and the re-establishment cell is an auxiliary entry of the handover list; and wherein said feedback information comprises a list of admitted radio bearers on the re-establishment cell.

2. The method of claim 1, wherein the step of updating the user equipment with the feedback information includes:
  preparing a handover list of handover cells on the basis of the feedback information, wherein the target cell is a main entry of the handover list and the re-establishment cell is an auxiliary entry of the handover list; and
  transmitting the handover list of handover cells from the source base station to the user equipment for updating the user equipment.

3. The method of claim 1, further comprising:
handing over the communication link to the target cell;
detecting a handover failure of handing over the communication link to the target cell; and
handing over the communication link to the re-establishment cell.

4. The method of claim 1, comprising:
selecting the target cell and a plurality of re-establishment cells of the target base station and at least one re-establishment base station on the basis of said measurement report, wherein said plurality of re-establishment cells includes the re-establishment cell;
initiating the handover preparation by transmitting the handover request from said source base station to said target base station and from said source base station to said at least one re-establishment base station, wherein said handover request indicates the target cell and said plurality of re-establishment cells;
carrying out admission control on the target cell and on said plurality of re-establishment cells;
initiating the handover by transmitting the handover request acknowledgement including the feedback information from said target base station to said source base station and by transmitting the handover request acknowledgement including the feedback information from at least one re-establishment base station, of said plurality of re-establishment base stations, to said source base station; and forwarding the feedback information from the source base station to the user equipment for updating the user equipment with feedback information representing the admission control on the target cell and on the at least one re-establishment cell and representing the availability of the target cell and the at least one re-establishment cell.

5. The method of claim 4, further comprising:
preparing a handover list of handover cells on the basis of the feedback information, wherein the target cell is a main entry of the handover list, a first re-establishment cell of said plurality of re-establishment cells is a first auxiliary entry of the handover list and a second re-establishment cell of said plurality of re-establishment cells is a second auxiliary entry of the handover list.

6. The method of claim 1, further comprising:
initiating the handover preparation by transmitting the handover request from said source base station to an intermediate base station; and
forwarding said handover request from said intermediate base station to the target base station and to the re-establishment base station.

7. The method of claim 1, further comprising:
transmitting the handover request acknowledgement from said target base station and/or said re-establishment base station to an intermediate base station; and
forwarding said handover request acknowledgement from said intermediate base station to the source base station.

8. The method of claim 1, further comprising:
selecting a cell of an intermediate base station on the basis of said measurement report; and
initiating the handover preparation by transmitting a combined handover request from said source base station to said intermediate base station, wherein said combined handover request indicates the target cell and the re-establishment cell of the target base station and the re-establishment base station and the cell of the intermediate base station.

9. A non-transitory computer readable medium storing program code for, when executed, causing a computer to perform the method of claim 1.

10. A mobile communication system comprising a plurality of base stations and a user equipment, wherein a communication link is established between the user equipment and a source base station of said plurality of base stations, the mobile communication system being configured to:
  select a target cell controlled by a target base station from among the plurality of base stations and a re-establishment cell controlled by a re-establishment base station from among the plurality of base stations and different from the target base station on the basis of a measurement report, said measurement report comprising measurements of attributes of cells of said plurality of base stations for a handover;
  initiate a handover preparation by transmitting a handover request from said source base station to said target base station and from said source base station to said reestablishment base station, wherein said handover request indicates the target cell and the re-establishment cell;

carry out admission control on the target cell and on the re-establishment cell;

initiate the handover by transmitting a handover request acknowledgement from said target base station to said source base station and transmitting a different handover request acknowledgment from said re-establishment base station to said source base station, wherein said handover request acknowledgement includes feedback information representing the admission control on the target cell and the availability of the target cell, and wherein said different handover request acknowledgment includes feedback information representing the admission control on the reestablishment cell and availability of the re-establishment cell; and update the user equipment with the feedback information included in the handover request acknowledgement from the target base station and in the different handover request acknowledgement from the reestablishment base station;

wherein said update the user equipment with the feedback information further includes:
   forwarding the feedback information from the source base station to the user equipment; and
   preparing a handover list of handover cells on the basis of the feedback information, wherein the target cell is a main entry of the handover list and the re-establishment cell is an auxiliary entry of the handover list; and wherein said feedback information comprises a list of admitted radio bearers on the re-establishment cell.

11. A base station for use as a source base station in a wireless communication system, the mobile communication system comprising a plurality of base stations and a user equipment, wherein a communication link is established between the user equipment and the source base station of said plurality of base stations, the base station comprising:
   a memory that stores a plurality of instructions; and
   a processor coupled to the memory and configured to:
      select a target cell controlled by a target base station from among the plurality of base stations and a re-establishment cell controlled by a re-establishment base station from among the plurality of base stations and different from the target base station on the basis of a measurement report, said measurement report comprising measurements of attributes of cells of said plurality of base stations for a handover;
      initiate a handover preparation by transmitting a handover request to said target base station and to said re-establishment base station, wherein said handover request indicates the target cell and the re-establishment cell;
      initiate the handover when receiving a handover request acknowledgement from said target base station and receiving a different handover request acknowledgment from said re-establishment base station, wherein said handover request acknowledgement includes feedback information representing the admission control on the target cell and the availability of the target cell, and wherein said different handover request acknowledgment includes feedback information representing the admission control on the re-establishment cell and availability of the re-establishment cell; and
      update the user equipment with the feedback information included in the handover request acknowledgement from the target base station and in the different handover request acknowledgement from the reestablishment base station;
   wherein said update the user equipment with the feedback information further includes:
      forwarding the feedback information from the source base station to the user equipment; and
      preparing a handover list of handover cells on the basis of the feedback information, wherein the target cell is a main entry of the handover list and the re-establishment cell is an auxiliary entry of the handover list; and
   wherein said feedback information comprises a list of admitted radio bearers on the re-establishment cell.

12. User equipment for a wireless communication system, the mobile communication system comprising a plurality of base stations and the user equipment, wherein a communication link is established between the user equipment and a source base station of said plurality of base stations, the user equipment comprising:
   a memory that stores a plurality of instructions; and
   a processor coupled to the memory and configured to:
      transmit a measurement report to said source base station via said communication link, said measurement report comprising measurements of attributes of cells of said plurality of base stations for a handover;
      receive feedback information representing an admission control on a target cell and on a re-establishment cell of at least one candidate handover base station of the handover, wherein said feedback information further comprises information about availability of the target cell and availability of the re-establishment cell, wherein said feedback information further comprises a list of admitted radio bearers on the re-establishment cell; and
      prepare a handover list of handover cells on the basis of the feedback information, wherein the target cell is a main entry of the handover list and the re-establishment cell is an auxiliary entry of the handover list.

* * * * *